United States Patent
Tamor et al.

[19]

[11] Patent Number: 5,998,885
[45] Date of Patent: Dec. 7, 1999

[54] PROPULSION SYSTEM FOR A MOTOR VEHICLE USING A BIDIRECTIONAL ENERGY CONVERTER

[75] Inventors: Michael Alan Tamor, Toledo, Ohio; Allan Roy Gale, Livonia, Mich.

[73] Assignee: Ford Global Technologies, Inc., Dearborn, Mich.

[21] Appl. No.: 09/157,679

[22] Filed: Sep. 21, 1998

[51] Int. Cl.[6] ................................................... B60L 11/18
[52] U.S. Cl. ............................ 307/10.1; 307/9.1; 307/66; 180/65.1; 180/65.3; 318/139
[58] Field of Search .................................... 307/10.1, 9.1, 307/64, 66; 180/65.1, 65.3; 318/139, 143; 322/16; 320/101

[56] References Cited

U.S. PATENT DOCUMENTS

| | | |
|---|---|---|
| 3,982,962 | 9/1976 | Bloomfield . |
| 4,128,700 | 12/1978 | Sederquist . |
| 4,923,768 | 5/1990 | Kaneko et al. . |
| 5,071,719 | 12/1991 | Rostrup-Nielsen et al. . |
| 5,175,061 | 12/1992 | Hildebrandt et al. . |
| 5,212,431 | 5/1993 | Origuchi et al. ........................ 318/139 |
| 5,360,679 | 11/1994 | Buswell et al. . |
| 5,434,016 | 7/1995 | Benz et al. . |
| 5,645,950 | 7/1997 | Benz et al. . |
| 5,693,201 | 12/1997 | Hsu et al. . |
| 5,820,172 | 10/1998 | Brigham et al. ........................ 318/143 |
| 5,848,568 | 1/1999 | Hsu et al. ............................... 180/65.3 |
| 5,905,360 | 5/1999 | Ukita ...................................... 320/118 |
| 5,929,595 | 7/1999 | Lyons et al. ............................ 320/104 |

*Primary Examiner*—Albert W. Paladini
*Attorney, Agent, or Firm*—Mark S. Sparschu

[57] ABSTRACT

A motor vehicle propulsion system includes an electrical energy source and a traction motor coupled to receive electrical energy from the electrical energy source. The system also has a first bus provided electrical energy by the electrical energy source and a second bus of relatively lower voltage than the first bus. In addition, the system includes an electrically-driven source of reaction gas for the electrical energy source, the source of reaction gas coupled to receive electrical energy from the first bus. Also, the system has an electrical storage device coupled to the second bus for storing electrical energy at the lower voltage. The system also includes a bidirectional energy converter coupled to convert electrical energy from the first bus to the second bus and from the second bus to the first bus.

11 Claims, 1 Drawing Sheet

PROPULSION SYSTEM FOR A MOTOR VEHICLE USING A BIDIRECTIONAL ENERGY CONVERTER

This invention was made with Government support under Contract DE-AC02-94CE50389 awarded by the Department of Energy. The Government has certain rights in the invention.

BACKGROUND OF THE INVENTION

1. Field of the Invention

The present invention relates to propulsion systems for motor vehicles, and more particularly to electrically-propelled vehicles.

2. Description of the Related Art

In an electric vehicle which employs a fuel cell for its electric power, a concern arises regarding start-up of the fuel cell. Typically, reaction air is provided to the fuel cell by a turbocompressor driven in part by exhaust gases from the fuel cell's operation and in part by an electric motor. For optimal efficiency and reduced packaging size, it is advantageous for the compressor's motor to be a high-voltage device coupled to the relatively-high voltage output of the fuel cell. However, when the fuel cell is to undergo start-up, the fuel cell is not yet providing electrical energy or exhaust gas sufficient to operate the compressor. Without a compressor operating at sufficient capacity, the fuel cell will not have reaction air sufficient for start-up.

Several methods for providing reaction air to the fuel cell might be tried. For example, a supply of compressed air could be carried onboard the vehicle.

That compressed air could be used to start the fuel cell. However, such a supply of compressed air would have disadvantages regarding packaging in the vehicle.

Another method for providing reaction air at startup would be to provide high-voltage electrical energy storage on the high voltage bus of the vehicle (where the compressor would also most advantageously reside). Such stored electrical energy could power the compressor for start-up. However, providing high voltage storage for this singular purpose would be disadvantageous both for cost and packaging.

A typical vehicle having a high-voltage drive portion, such as a vehicle powered by a fuel cell, will still have a 12-volt portion which includes the traditional electrical accessories on a vehicle. This 12-volt portion would have a battery for energy storage and would be supplied electrical energy by a DC-to-DC downconverter from the high voltage bus. Yet another method for providing reaction air at start-up would be through the use of a DC-to-DC upconverter which would convert voltage from the 12-volt battery to high voltage for the compressor at start-up. After a very short start-up period (typically only about 20 seconds), this upconverter would not be used. Although workable, this is a cost- and packaging-inefficient use of the additional hardware represented by the DC-to-DC upconverter.

Therefore, a design which will overcome start-up difficulties with fuel-cell-propelled vehicles and which will do so in a cost-effective and packaging efficient manner will provide advantages over alternative designs.

SUMMARY OF THE INVENTION

The present invention provides a motor vehicle propulsion system. The system includes an electrical energy source and a traction motor coupled to receive electrical energy from the electrical energy source. The system further comprises a first bus provided electrical energy by the electrical energy source and a second bus of relatively lower voltage than the first bus. In addition, the system comprises an electrically-driven source of reaction gas for the electrical energy source, the source of reaction gas coupled to receive electrical energy from the first bus. The system further includes means coupled to the second bus for storing electrical energy at the lower voltage. Also, the system comprises a bidirectional energy converter coupled to convert electrical energy from the first bus to the second bus and from the second bus to the first bus.

The present invention further provides a method for controlling energy flow in an electrically-propelled vehicle having a traction motor coupled to a first bus and having energy storage means coupled to a second bus, the second bus having a voltage lower than the first bus. The method comprises upconverting energy from the energy storage means to provide motive energy to the traction motor.

The present invention further provides a method for controlling energy flow in an electrically-propelled vehicle having a traction motor coupled to a first bus and having energy storage means coupled to a second bus, said second bus having a nominal voltage lower than said first bus. The method comprises downconverting electrical energy generated by the traction motor from the first bus to the second bus. Additionally, the method includes storing the downconverted electrical energy in the energy storage means.

Systems according to the present invention can provide improved cost and packaging efficiency over alternative designs, as well as providing vehicle propulsive performance and energy efficiency advantages.

DETAILED DESCRIPTION OF THE PREFERRED EMBODIMENT

Figure 1:
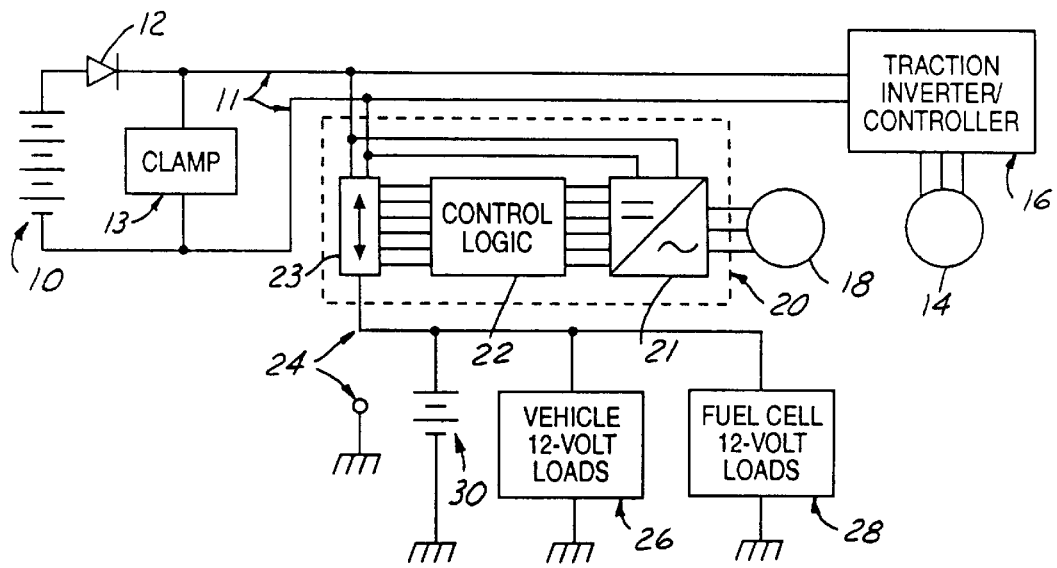
FIG. 1 is a schematic diagram of an electric vehicle propulsion system using a fuel cell as the electrical energy source.

Refer first to FIG. 1, where an electric vehicle propulsion system is illustrated. The source of electrical energy for the system is a fuel cell 10. Fuel cell 10 provides its output energy at a relatively high voltage (in the vicinity of 300 volts) via a high-voltage bus 11. A reverse voltage protection diode 12 and an overvoltage clamp 13 are provided for system protection. A traction motor 14 is coupled to receive motive power from fuel cell 10 via an inverter/controller module 16 Inverter/controller module 16 includes semiconductor switches for converting direct current energy from fuel cell 10 into alternating current for traction motor 14. Inverter/controller module 16 also includes motor control logic for controlling traction motor 14. Of course, inverter/controller module 16 has sufficient microcomputer resources (throughput, memory, inputs, outputs and the like) to perform the control function ascribed to it herein.

Reaction air is provided to fuel cell 10 by a compressor 18. Compressor 18 preferably includes and is driven at least in part by a three-phase AC motor. Compressor 18 is controlled by a controller 20. Controller 20 includes an inverter 21 for converting the high voltage DC at bus 11 into AC for compressor 18. Inverter 21 is controlled for appropriate operation of compressor 18 by control logic 22, preferably a microprocessor or microcontroller.

Controller 20 preferably also includes a bi-directional DC-DC converter 23, the operation of which will be described below.

The system of FIG. 1 also includes a lower-voltage bus 24, preferably having a nominal voltage of 12 volts. Powered by this bus are vehicle 12-volt loads 26. These are the traditional electrical loads on a motor vehicle, such as lighting, power accessories, radio and the like. Also included on lower-voltage bus 24 are fuel cell 12-volt loads 28. Fuel cell 12-volt loads 28 include logic power for the fuel cell master controller, fuel flow regulator solenoids, sensors and other loads required for proper fuel cell operation. Further included on lower-voltage bus 24 is a battery 30 for energy storage at the lower voltage.

At vehicle start-up, when fuel cell 10 is not providing sufficient power to drive compressor 18, DC-to-DC converter 23 is operated as an up-converter to provide high-voltage energy for operating compressor 18. Once fuel cell 10 has sufficiently started operating, this up-conversion is no longer performed, and compressor 18 can be powered from the output provided by fuel cell 10 to high-voltage bus 11.

At this point, DC-to-DC converter 23 is operated as a down converter, converting the high voltage from bus 11 to the relatively lower voltage of bus 24. Power is thus provided to charge battery 30 and provide energy for loads 26 and 28. Typically, about one kilowatt of power will be converted for this purpose.

Figure 2:
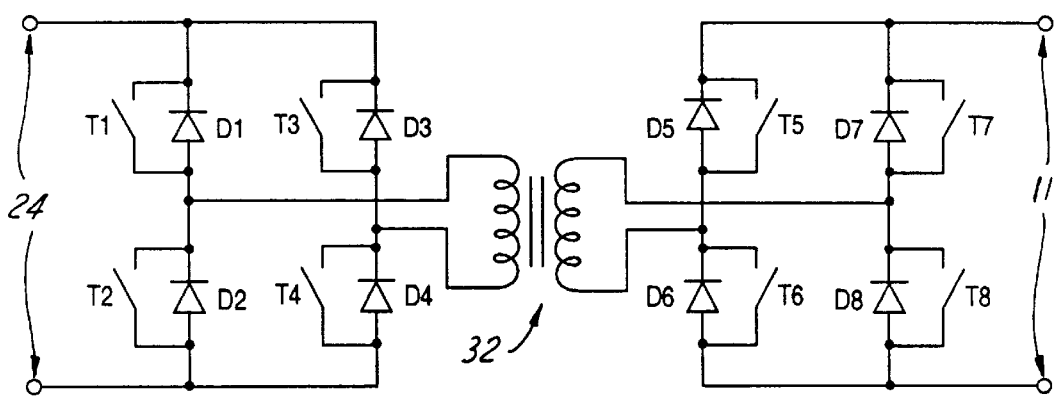
FIG. 2 is a schematic diagram of DC-to-DC converter 23 of FIG. 1.

DC-to-DC converter 23 is illustrated in detail in FIG. 2. DC-to-DC converter 23 is coupled between higher voltage bus 11 and lower voltage bus 24. DC-to-DC converter 23 includes semiconductor switches T1–T8, each switch T1–T8 having an associated diode D1–D8 across it. Control logic 22 controls the switching of semiconductor switches T1–T8.

In the up-conversion role of DC-to-DC converter 23, switches T1–T4 convert the DC voltage at bus 24 into AC, the voltage of which is then increased by transformer 32. Diodes D5–D8 then act as a bridge rectifier to rectify the AC voltage output of transformer 32 to DC for higher voltage bus 11. During the up-conversion role of DC-to-DC converter 23, switches T5–T8 are held open.

In the down-conversion role of DC-to-DC converter 23, switches T5–T8 convert the DC voltage at higher voltage bus 11 into AC, the voltage of which is then decreased by transformer 32. Diodes D1–D4 act as a bridge rectifier to provide rectified DC energy to lower voltage bus 24.

The design disclosed here has numerous additional benefits. For example, the vehicle's propulsive capability can be increased in transient situations by operating the vehicle 12-volt loads 26 and fuel-cell 12-volt loads 28 from battery 30 rather than from fuel cell 10. This will allow all of the energy from fuel cell 10 to be used to propel the vehicle. To further increase the vehicle's propulsive capability, power from battery 30 can even be up-converted for brief periods to help power traction motor 14.

A further benefit of this design is that battery 30 can be used to store some electrical energy generated by traction motor 14 during regenerative braking. This energy would be downconverted from bus 11 to bus 24 by DC-to-DC converter 23. Storing regeneration energy in battery 30 improves the efficiency of the vehicle propulsion system.

The roles and advantages of diode 12 and clamp 13 will now be discussed in further detail. Diode 12 provides important reverse-voltage protection for fuel cell 10. If the fuel cell 10 is not providing its full output, such as at startup of the vehicle propulsion system, the voltage of high voltage bus 11 could damage fuel cell 10. Diode 12 prevents such damage.

Clamp 13 prevents the output voltage of bus 11 from drastically rising in the event that the electrical loading on bus 11 suddenly decreases. This helps to protect the various semiconductor switches in inverter/controller module 16, inverter 21 and DC-to-DC converter 23. Clamp 13 effectively places a sufficient load on bus 11 to prevent its voltage from rising excessively.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A motor vehicle propulsion system comprising:

an electrical energy source;

a traction motor coupled to receive electrical energy from said electrical energy source;

a first bus provided electrical energy by said electrical energy source;

a second bus of relatively lower voltage than said first bus;

an electrically-driven source of reaction gas for said electrical energy source, said source of reaction gas coupled to receive electrical energy from said first bus;

means coupled to said second bus for storing electrical energy at said lower voltage; and a bidirectional energy converter coupled to convert electrical energy from said first bus to said second bus and from said second bus to said first bus.

2. A motor vehicle propulsion system as recited in claim 1, wherein said bidirectional energy converter is a bidirectional DC-to-DC converter.

3. A motor vehicle propulsion system as recited in claim 2, wherein said bidirectional DC-to-DC converter includes exactly one transformer.

4. A motor vehicle propulstion system as recited in claim 2, wherein said bidirectional DC-to-DC converter includes shared electromagnetic voltage conversion elements for performing voltage upconversion and voltage downconversion.

5. A motor vehicle propulsion system as recited in claim 4, wherein said source of electrical energy is a fuel cell.

6. A motor vehicle propulsion system as recited in claim 4, wherein means for storing electrical energy is a battery.

7. A motor vehicle propulsion system as recited in claim 4, wherein said source of reaction gas is a compressor.

8. A motor vehicle propulsion system as recited in claim 1, wherein:

said system further comprises a controller to control said electrically-driven source of reaction gas; and said controller also controls said bidirectional energy converter.

9. A motor vehicle propulsion system as recited in claim 8, wherein said bidirectional energy converter is a bidirectional DC-to-DC converter.

10. A motor vehicle propulsion system as recited in claim 9, wherein said bidirectional DC-to-DC converter includes exactly one transformer.

11. A motor vehicle propulsion system as recited in claim 9, wherein said bidiretional DC-to-DC converter includes shared electromagnetic voltage conversion elements for performing voltage upconversion and voltage downconversion.

\* \* \* \* \*